(12) United States Patent
Stasiak et al.

(10) Patent No.: US 10,901,368 B2
(45) Date of Patent: Jan. 26, 2021

(54) METHOD FOR INTEGRATING A HOLOGRAM INTO A SECURITY DOCUMENT BODY AND SECURITY DOCUMENT BODY

(71) Applicants: BUNDESDRUCKEREI GMBH, Berlin (DE); COVESTRO DEUTSCHLAND AG, Leverkusen (DE)

(72) Inventors: Michael Stasiak, Koenigs Wusterhausen (DE); Michael Knebel, Berlin (DE); Andre Leopold, Berlin (DE); Olga Kulikovska, Berlin (DE); Enrico Orselli, Cologne (DE); Thomas Roelle, Leverkusen (DE); Wieland Hovestadt, Leichlingen (DE); Dennis Hoenel, Zuelpich-Wichterich (DE)

(73) Assignees: Bundesdruckerei GmbH, Berlin (DE); Covestro Deutschland AG, Leverkusen (DE)

( * ) Notice: Subject to any disclaimer, the term of this patent is extended or adjusted under 35 U.S.C. 154(b) by 267 days.

(21) Appl. No.: 16/065,187

(22) PCT Filed: Dec. 22, 2016

(86) PCT No.: PCT/EP2016/082460
§ 371 (c)(1),
(2) Date: Jun. 22, 2018

(87) PCT Pub. No.: WO2017/109119
PCT Pub. Date: Jun. 29, 2017

(65) Prior Publication Data
US 2019/0018365 A1    Jan. 17, 2019

(30) Foreign Application Priority Data
Dec. 22, 2015 (DE) .................. 10 2015 226 604

(51) Int. Cl.
*G03H 1/00* (2006.01)
*B32B 33/00* (2006.01)
(Continued)

(52) U.S. Cl.
CPC .......... *G03H 1/0011* (2013.01); *B32B 33/00* (2013.01); *B32B 37/02* (2013.01); *B32B 37/182* (2013.01);
(Continued)

(58) Field of Classification Search
None
See application file for complete search history.

(56) References Cited

U.S. PATENT DOCUMENTS

| | | | |
|---|---|---|---|
| 4,765,656 A | 8/1988 | Becker et al. | |
| 6,066,378 A | 5/2000 | Morii et al. | |

(Continued)

FOREIGN PATENT DOCUMENTS

| | | |
|---|---|---|
| CN | 1930532 A | 3/2007 |
| CN | 101120139 A | 2/2008 |

(Continued)

*Primary Examiner* — Jennifer D. Carruth
(74) *Attorney, Agent, or Firm* — Laurence A. Greenberg; Werner H. Stemer; Ralph E. Locher

(57) ABSTRACT

A method for integrating a hologram into the body of a security document that has a laminated body. The method includes: providing a holographic film having a backing substrate layer and a photo layer; providing additional substrate layers; carrying out a laminating process in order to form the laminated body, the holographic film together with the additional substrate layers being collated to form a substrate layer stack and being combined, together with the additional substrate layers, in a high-pressure, high-temperature laminating method to form the laminated body. There is also described a corresponding security document body.

9 Claims, 3 Drawing Sheets

(51) Int. Cl.
*B32B 37/02* (2006.01)
*B32B 37/18* (2006.01)
*G03H 1/02* (2006.01)
*B42D 25/328* (2014.01)
*B42D 25/455* (2014.01)
*B42D 25/46* (2014.01)
*B32B 37/00* (2006.01)
*B32B 38/10* (2006.01)
*B32B 37/20* (2006.01)
*G03H 1/18* (2006.01)

(52) U.S. Cl.
CPC ........ *B42D 25/328* (2014.10); *B42D 25/455* (2014.10); *B42D 25/46* (2014.10); *G03H 1/0248* (2013.01); *G03H 1/0252* (2013.01); *B32B 37/203* (2013.01); *B32B 38/10* (2013.01); *B32B 2037/0092* (2013.01); *B32B 2310/0831* (2013.01); *B32B 2310/0843* (2013.01); *B32B 2425/00* (2013.01); *G03H 2001/185* (2013.01)

(56) References Cited

U.S. PATENT DOCUMENTS

| | | | |
|---|---|---|---|
| 6,179,338 B1 | 1/2001 | Bergmann et al. | |
| 6,994,937 B2* | 2/2006 | Toshine | B44C 1/1716 283/81 |
| 8,027,238 B2 | 9/2011 | Ehreke et al. | |
| 8,284,492 B2 | 10/2012 | Crane et al. | |
| 8,488,430 B2 | 7/2013 | Saito et al. | |
| 2003/0051818 A1* | 3/2003 | Shirakura | G03H 1/268 156/443 |
| 2003/0129345 A1 | 7/2003 | Morii et al. | |
| 2013/0042966 A1* | 2/2013 | Look | B60R 13/105 156/227 |
| 2013/0113201 A1 | 5/2013 | Endres et al. | |
| 2014/0340723 A1 | 11/2014 | Matsubara et al. | |
| 2017/0157971 A1 | 6/2017 | Oikawa et al. | |

FOREIGN PATENT DOCUMENTS

| | | |
|---|---|---|
| CN | 101443692 A | 5/2009 |
| CN | 102610245 A | 7/2012 |
| CN | 103025523 A | 4/2013 |
| CN | 103380006 A | 10/2013 |
| CN | 103518163 A | 1/2014 |
| CN | 104203589 A | 12/2014 |
| CN | 104220269 A | 12/2014 |
| DE | 102004012787 A1 | 10/2005 |
| DE | 102007050277 A1 | 4/2009 |
| DE | 102007052951 A1 | 5/2009 |
| DE | 102008034984 A1 | 2/2010 |
| DE | 102010035889 A1 | 3/2012 |
| DE | 102014203080 A1 | 8/2015 |
| EP | 0219012 A2 | 4/1987 |
| EP | 2530533 A1 | 12/2012 |
| WO | 9415319 A1 | 7/1994 |
| WO | 2016011249 A2 | 1/2016 |

* cited by examiner

METHOD FOR INTEGRATING A HOLOGRAM INTO A SECURITY DOCUMENT BODY AND SECURITY DOCUMENT BODY

BACKGROUND OF THE INVENTION

Field of the Invention

The invention relates generally to a method of integrating a hologram into a security document body that comprises a laminated body, and to a security document body of this kind.

Known from the prior art are security documents that are overall designed as a laminated body or include a laminated body. Modern identity cards, driver's licenses, identification cards, as well as credit cards and other documents, are often designed as a card-shaped body. These frequently comprise holograms for assurance purposes. Security document bodies are also included, for example, as passport cards, as information pages in passports.

While a group of holograms, referred to as surface holograms or thin holograms, may be formed and produced over, for example, an embossment of a surface, another group of holograms exists that are stored in a bulk material and accordingly referred to as volume holograms. These volume holograms are typically stored in a photo layer. Volume reflection holograms, which are intended for reconstructing the hologram in a reflective geometry, are widely used. In this case, the illumination is done with a reconstruction light from the same side of the hologram as the observation of the reconstructed hologram.

If the security document body is designed to be transparent at least in individual areas, then volume transmission holograms may also be used.

In all cases, the hologram is used to secure the security document body against falsification and counterfeiting, and to secure the information stored therein, such as facial images and other biometric data, as well as e.g. the name, date of birth, and birthplace of a holder, as well as the country of issue, or a document number assigned to the security document, etc.

It has proven particularly advantageous to integrate full-surface hologram layers into security documents. For example, German identity cards and the passport cards for German passports contain a full-surface hologram known under the Identigram brand, in which a plurality of different diffractive optical security features are integrated, including in each case at least one volume reflection hologram.

In the production process of the prior art, the different diffractive security features, such as the volume reflection hologram, are formed in a holographic film that comprises a backing substrate layer and a photo layer arranged thereon. The photo layer is typically formed as an emulsion comprising a photopolymer. After exposure of the holographic film, the holographic film is fixated by the application of energy. Next, the holographic film is glued to a laminated body using an adhesive. The laminated body is typically produced from a plurality of substrate layers in a high pressure, high temperature lamination process. In addition, the photo layer of the holographic film is furnished with a protective layer that is applied as a protective lacquer layer in the prior art.

A major problem with respect to security is that there is a general risk that counterfeiters will remove, replace and/or manipulate individual parts of a security document body. In this case, there is a particular risk that the adhesive bond between the holographic film and the remainder of the laminated body may be attacked in order to separate the holographic film from the remainder of the document body.

It has also proven unfavorable in practice to furnish the hologram with a liquid-applied protective layer, because this requires very careful processing in order to form a homogeneous protective layer on the holographic film that has already been exposed.

The underlying objective of this invention is to improve the method of integrating a hologram of this kind, and in particular to provide a security document with higher security against the possibility of falsification.

BRIEF SUMMARY OF THE INVENTION

The invention is based on the idea of using a holographic film, combining it in a single lamination step with additional substrate layers that form the security document body, and by this means to integrate the hologram into the security document body. This yields a security document in which the security document body is formed as a laminated body from a backing substrate layer and additional substrate layers, the backing substrate layer being bonded to a photo layer in which the hologram is stored.

Definitions

A hologram, for the purpose of the invention described here, is holographic information stored in a photo layer, which may be reconstructed by means of irradiation with light of suitable wavelength and direction. Interference structures representing the hologram are stored in the photo layer. This may be done for example via local refractive index variations. An exposed film in which the hologram is stored is often also referred to as a hologram, although this is actually a hologram storage.

A photo layer refers to a layer in which a hologram may be stored via an exposure process, or is stored after the hologram has been exposed and fixed. In the unexposed state, such a photo layer may be formed, for example, as an emulsion comprising a photopolymer. Other embodiments may also comprise a gelatin-based emulsion comprising a silver halide.

A backing substrate layer is a substrate layer that is mechanically self-supporting and onto which the photo layer is applied.

A holographic film is a film-like material comprising a backing substrate layer and a photo layer applied thereon.

To avoid damage to the holographic film, in particular the photo layer, before and during processing of the holographic film, the holographic film may be furnished with a protective sheet arranged on the side of the photo layer facing away from the backing substrate layer. For the purposes of the processes described here, the hologram protective layer does not belong to the holographic film, even if the holographic film furnished with the hologram protective layer is provided as a unitary semifinished product, for example in roll or sheet form.

A curable protective layer is a flat layer that may be changed in terms of chemical and/or physical structure by applying energy, so that it has a greater strength after energy is applied. In particular, such a layer comprises prepolymers, monomers and/or oligomers or polymers, which by the operation of energy are brought to a higher polymerization stage and/or crosslinking.

A full-surface layer formed in a solid document body or a full-surface film or a full-surface holographic film is considered to be a layer or a film or a holographic film extending over the entire surface of the security document body. In the production context, layers and films are considered to be full-surface, if they have a planar extension that corresponds at least to the planar extent of the security document body to be produced. In a card-shaped security document body, the largest surface, the area used to judge this feature, or the surface perpendicular to the direction in which the layers, i.e., the substrate layers and a film or holographic film, are superposed on each other and laminated to the security document body.

PREFERRED EMBODIMENTS

Proposed is a method of integrating a hologram into a security document body that comprises a laminated body, comprising the steps of: providing a holographic film having a backing substrate layer and a photo layer; providing further substrate layers; performing lamination to form the laminated body, wherein the holographic film is collated in a substrate layer stack together with the additional substrate layers, and is combined with the additional substrate layers in a lamination process to form the laminated body. This achieves a very good adhesion of the holographic film to the additional substrate layers.

Furthermore, the production process is simplified. In particular, the handling of an adhesive, as hitherto used in the prior art, is eliminated.

This yields a security document body with a hologram, wherein the security document body is formed from a plurality of planarly mutually adjoining substrate layers and a photo layer in which the hologram is stored, the photo layer being bonded on one side to a backing substrate layer which is an outer member of a plurality of the adjacent substrate layers, and the plurality of substrate layers including the backing substrate layer, to which the photo layer is bonded, are bonded into a laminated body via a lamination process.

Particularly preferably, the substrate layers and holographic film are formed to be full-surface. Particularly preferably, the substrate layers and holographic film have the same lateral dimensions. This facilitates manual handling of the substrate layers and the holographic film, as well as lamination. A full-surface bond is enabled between the holographic film and the adjacent substrate layer.

Particularly preferably, the lamination is carried out in a high-temperature high-pressure lamination process. High-temperature, high-pressure lamination processes are considered to be those lamination processes in which the temperature in the substrate layer stack is increased in such a way that the glass transition temperature/melting temperature of at least one of the mutually adjoining substrate layers inside the substrate layer stack is reached. Preferably, the lamination process is performed at a temperature above the glass transition temperature of all of the plurality of substrate layers, including the backing substrate layer.

To protect the photo layer in which the hologram is stored in a finished security document or to protect the security document body, one embodiment provides that a curable protective sheet is coated directly onto the photo layer. A curable protective layer of this kind may be reliably bonded to the photo layer of the holographic film during curing.

The lamination process is carried out as a lamination step, which means that all layers laminated together are bonded together at simultaneously.

Particularly good protection against delamination or separation of the document body may be achieved by virtue of the fact that the plurality of substrate layers, including the backing substrate layer, are all produced based on the same plastic material. In such an embodiment, it is possible that the plurality of substrate layers including the backing substrate layer are bonded together in such a way that there are no detectable phase transitions, with respect to the polymer structure in the plastic material, between the material layers, which correspond to the plurality of substrate layers in the finished security document body and from which the security document body is made. Thus, in terms of polymer structure, a monolithic security document body is produced. Obviously, in each case a phase transition may also be established with regard to the plastic or polymer structure at the boundary between the backing substrate layer and the photo layer or at the interface between the photo layer and the cured or curable protective sheet. Moreover, transitions may be recognized between the material layers in the security document body that are caused by stains for dyeing or printing or the like. With regard to the polymer structure, however, no phase transition is detectable between the additional substrate layers and the backing substrate layer in a document body of this kind, after the lamination process.

A very good bond, which cannot be dissolved without destruction, is achieved between the substrate layers and the holographic film, even without the use of a primer or the like.

Preferably, the additional substrate layers and the backing substrate layer of the holographic film are all formed as polycarbonate layers. This yields a particularly stable and durable security document body.

In one embodiment, the holographic film is exposed but not yet fixated. In such a case, the curable protective sheet may be coated onto the holographic film before lamination. Preferably, in such an embodiment, the curing and fixating of the hologram in the holographic film are brought about simultaneously by supplying energy. More preferably, the curing and fixation is effected by irradiation of ultraviolet light.

In another embodiment, the curable protective sheet is coated onto the holographic film after exposure and fixation but before lamination. Curing is particularly preferably carried out by irradiation of ultraviolet light. Lamination takes place after the curing the protective sheet.

In another embodiment, the coating of the curable protective sheet and the subsequent curing take place only after the holographic film has been combined with the additional substrate layers to form the laminated body in the lamination process. Thus, materials for the curable protective sheet may be used that are incompatible with a lamination process, for example, insufficiently heat-resistant.

For example, a sheet sold under the name "Bayfol OX 500" by Covestro AG, may be used for the protective sheet.

In yet another embodiment, the curable protective sheet is cured during the lamination step or lamination process.

To protect the photo layer of the holographic film, the holographic film is usually provided with a holographic film protective sheet covering the photo layer of the holographic film. This sheet is removed before coating with the protective sheet.

To be able to use particularly thin protective sheets while still ensuring straightforward mechanical handling, in some embodiments the curable protective sheet is provided with a backing sheet. In addition, the curable protective sheet may also have an additional covering sheet on the side facing away from the backing sheet. This covering sheet is removed similarly to the holographic film protective sheet, before coating the protective sheet onto the photo layer.

However, the backing sheet may remain on the curable protective sheet during the lamination step, even if it has already cured before a lamination step, and only then be removed from the finished security document body.

In the case of a finished security document body, therefore, a protective sheet that has cured after being coated on is arranged on the side of the photo layer facing away from the backing substrate layer. Typical layer thicknesses for the cured protective sheet are in the 1 to 30 μm range, more preferably in the range 3 to 15 μm range, and most preferably such a layer thickness is about 5 μm.

The thickness of the photo layer is preferably likewise in the 5 to 20 μm range; especially preferably, the thickness is approximately 10 μm. Particularly preferably, a volume reflection hologram is imprinted in the photo layer, which is particularly preferably produced as an individualized contact copy of a hologram master. The individualization takes place via a spatial modulation of the light used for copying.

In a further embodiment, the curable protective sheet is coated directly onto the photo layer of the holographic film before exposing the holographic film, with which the hologram is exposed in the film layer. Subsequently, the semi-finished product, consisting of the exposed holographic film with the protective sheet arranged thereon, may be simultaneously cured and fixated by UV irradiation. This semi-finished product is then joined to the security document body in the lamination step with the additional substrate layers.

BRIEF DESCRIPTION OF THE SEVERAL VIEWS OF THE DRAWING

The invention will be explained in greater detail with reference to a drawing. The drawings show the following.

The same technical features are assigned the same reference numerals in all drawings.

DESCRIPTION OF THE INVENTION

Figure 1:
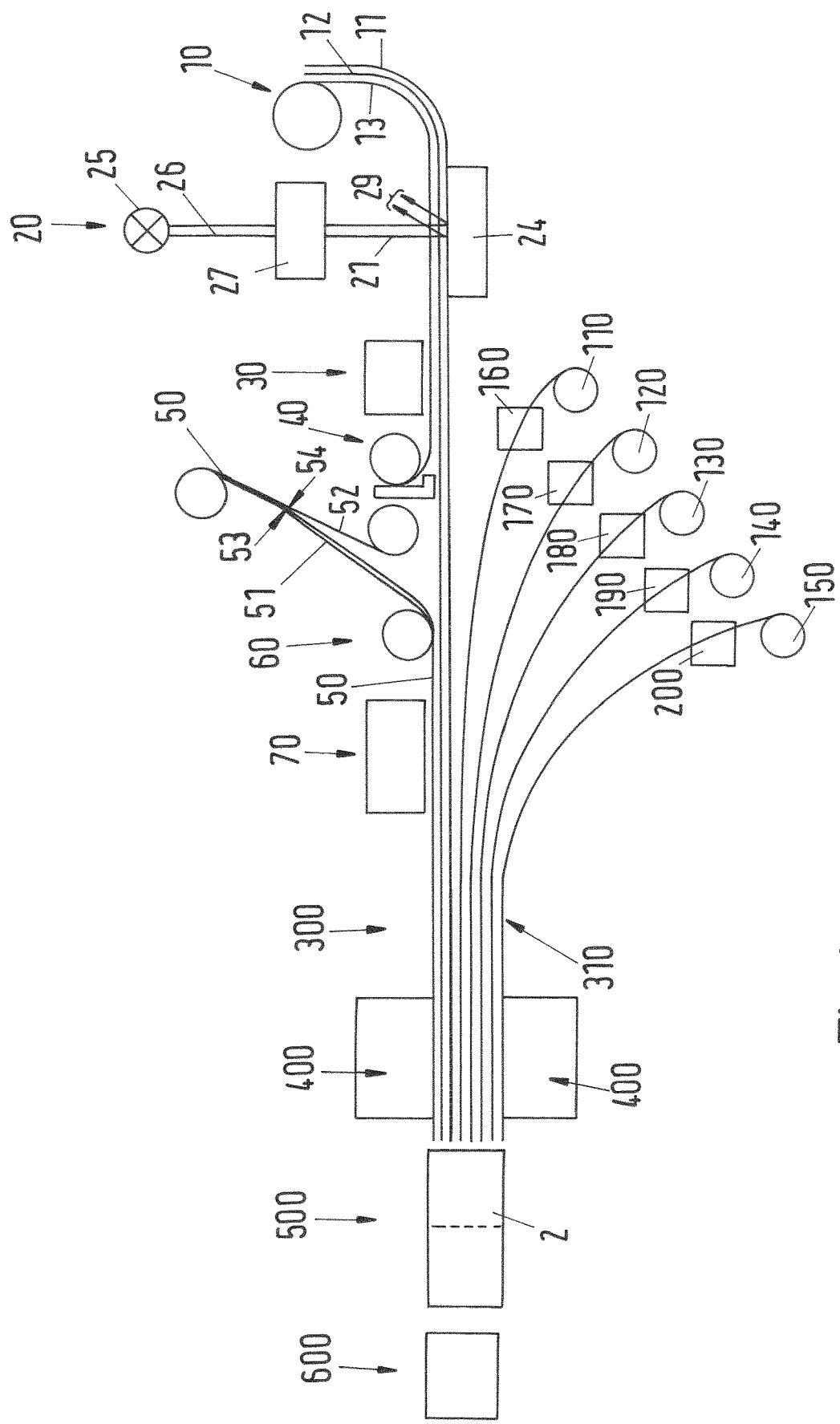
FIG. 1 shows a schematic view to illustrate the production of a security document body.

In FIG. 1, the production of a security document body 1 is shown schematically. First, a holographic film 10 is provided, for example as roll material. This holographic film 10 comprises a backing substrate layer 11 and a photo layer 12 applied thereto. The holographic film 10 is additionally bonded to a holographic film protective sheet 13 which protects the photo layer 12 from damage during processing.

The holographic film 10 is fed into a contact copying station 20. In this station, the holographic film 10 is placed in contact with a hologram master 24. A laser 25 generates coherent light 26 which is passed through a spatial light modulator 27. This results in spatial modulation of the coherent light 26. The coherent light 28 that has been modulated in this way penetrates through the holographic film 10 to the hologram master 24 and is diffracted thereon, reconstructing a hologram of the hologram master 24 at different positions with light of different intensity. The diffracted light 29 interferes with the modulated coherent light 28 radiated from the special light modulator in the photo layer 12, and thus stores in the holographic film 10 an individualized copy of the hologram of the hologram master 24.

The exposed holographic film 10 is then optionally fixed in a fixating station 30. As explained below, the fixating may also take place at another time in another station.

In the illustrated embodiment, the holographic film protective sheet 13 is removed from the holographic film in a separation station 40. A curable protective sheet 50 is also provided, for example as roll material. The protective sheet 50 is furnished on one side 53 with a backing sheet 51 and on an opposite side 54 it is furnished with a covering sheet 52. The covering sheet 52 is removed from the curable protective sheet 50 in a separation station 55. In a coating station 60, the curable protective sheet 50 is coated directly onto the photo layer 12 of the holographic film 10, which typically is still bonded to the backing sheet 51. If the curable covering sheet is mechanically self-supporting, the backing sheet 51 may be omitted.

In a curing/fixating station 70, the curable protective sheet 50 is then cured and firmly bonded to the photo layer 12 of the holographic film 10. If the exposed holographic film 10 has not been fixated in the fixating station 30, the fixation of the exposed hologram may take place simultaneously with curing, in the curing and fixating station 70.

For production of the security document body 1, additional substrate layers 110, 120, 130, 140, 150 are additionally provided. In the illustrated embodiment, the additional substrate layers 110-150 are each provided as roll material. In processing stations 160, 170, 180, 190, 200, the additional substrate layers 110-150 may be processed individually, for example by printing, by punching out partial areas, by embossing, by applying and/or introducing additional elements (chips, patches, etc.). The additional substrate layers 110-150 that have been preprocessed in this way are collated in a collating station 300 with the holographic film 10 and the protective sheet 50 applied thereto, to form a substrate layer stack 310. In this case, the backing substrate layer 11 adjoins one of the additional substrate layers 110-150 and forms the outermost of these substrate layers 110-150, 11. The holographic film 10 and substrate layers 110-150 overlap each other over in a full-surface fashion, i.e. at least in a region having a planar extension corresponding to at least one planar extension of a security document body to be produced. In a coating station 400, lamination is then carried out by introducing heat and applying pressure. In this case, the additional substrate layers 110-150 and the backing substrate layer 11 are all planarly bonded to one another. The result is a laminated body 2. The bond is formed without using a primer. In a trimming and/or separating device 500, individual security document bodies 1 are separated and trimmed from the laminated body 2 that has been formed. In a subsequent further processing station 600, further post-processing steps may be carried out, for example individualization by a laser marking, electronic marking by storing data in a microchip inserted between the substrate layers, etc. Additionally, the backing sheet 51 provided with the covering sheet may be removed. This removal may also take place before or during separation and trimming. As a protective layer, however, this sheet may also remain until in place until the security document body 1 is delivered or further processed.

Figure 2:
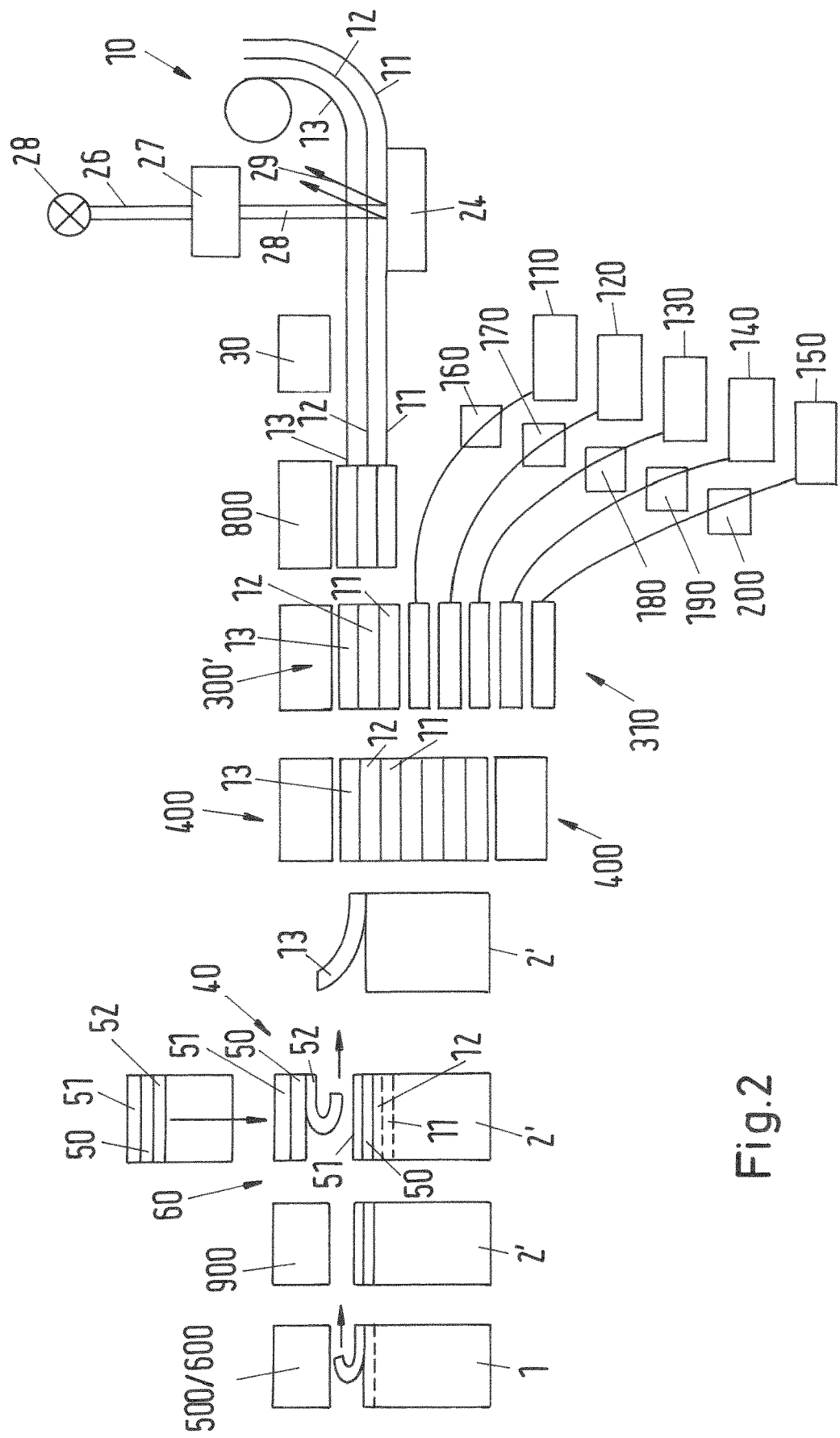
FIG. 2 shows another schematic view to illustrate the production of a security document body.

FIG. 2 shows a modification of the production of a security document body 1. The illustrated method differs substantially in that the additional substrate layers 110-150 are provided as sheets. Accordingly, the holographic film 10 is subdivided into sheets in a separating device 800, and sheets of the additional substrate layers 110-150 as well as the sheet of the holographic film 10 are collated with the backing substrate layer 11 in the collating station 300'. In this embodiment, the holographic film protective sheet 13 is still arranged on the photo layer and the curable protective sheet 50 is not yet coated onto the holographic film 10. The individual sheets preferably all have the same planar dimensions. The sheets overlap each other in a full-surface manner in a region that corresponds in size to at least the dimensions of a security document body to be produced.

The lamination thus takes place in the laminating station 400 without the protective sheet 50. The holographic film protection film 13 is then removed from the resulting laminated body 2' and the protective sheet 50, from which any covering sheet 52 that may be present is removed, is coated on and then cured in a curing station 900. Subsequently, a possible separation and/or trimming as well as post-processing takes place once again, as explained above in bond with FIG. 1. Likewise, the backing sheet 51 may be removed.

Figure 3:
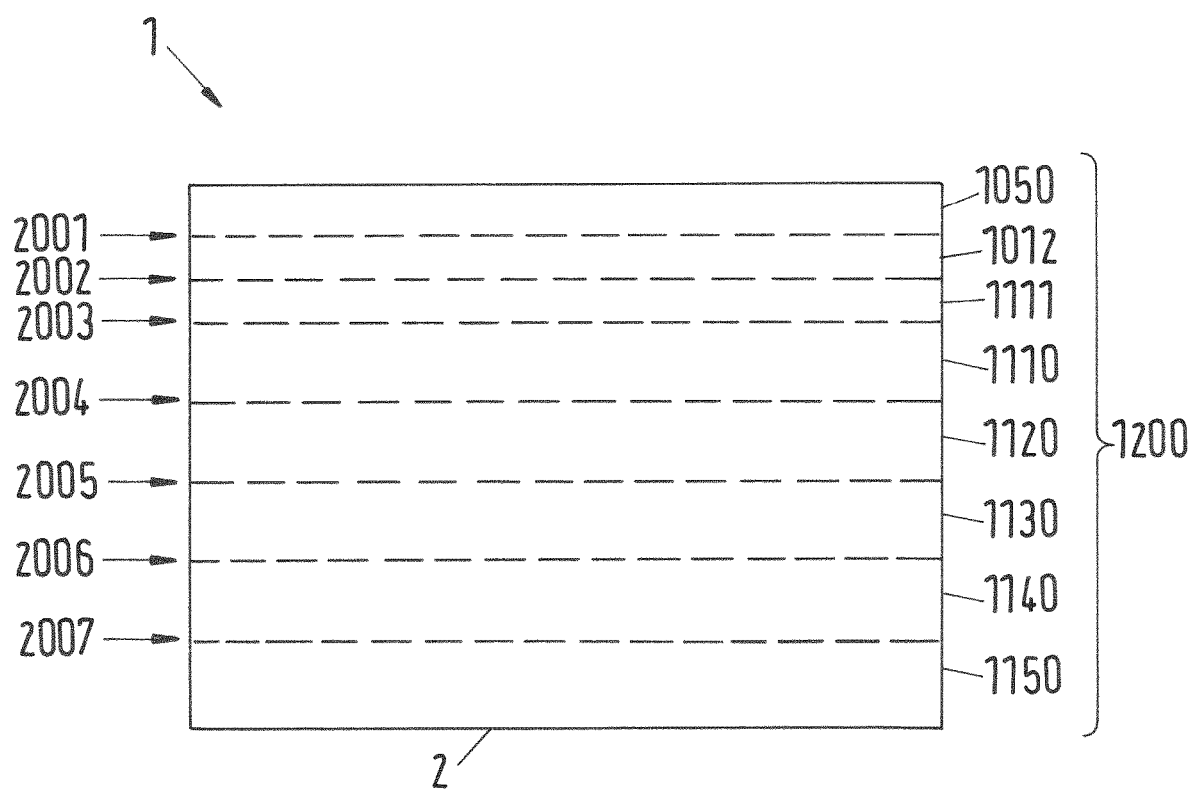
FIG. 3 shows a schematic sectional view through a security document body.

FIG. 3 schematically depicts a cross-section through a finished security document body 1. Dashed lines indicate the transitions 2001-2006 of the material layers 1050, 1012, 1011, 1110-1115 in the laminated body, which coincide with boundary surfaces of the substrate layers 50, 12, 11, 110-150 from which the laminated body is formed. The corresponding material layers are identified by reference numerals which are larger by one thousand than the reference numerals of the substrate layers and sheets from which the material layers are formed.

A material layer 1011 corresponding to the backing substrate layer 11 of the holographic film 10 is arranged over the material layers 1110-1150 formed from the additional substrate layers 110-150. Above this is placed the photo layer 1012 with the hologram exposed therein, and the cover layer 1050 that has been coated thereon and cured.

If the backing substrate layer 11 and the additional substrate layers 110-150 are all produced based on the same polymer material, the result is a monolithic material block 1200 in which no phase transitions with regard to the polymer structure are detectable at the transitions 2003-2007 of the marked material layer boundaries 1011, 1110-1150 that coincide with the original substrate layer boundaries prior to lamination. The photo layer 1012 is arranged on this monolithic material body 1200, with the protective sheet 1050 coated thereon. This yields a security document body 1 that is well-protected from delamination attempts. This may be used for example as a personal identification, identity card, passport, driver's license or the like. If it is attempted to separate the monolithic material body 1200 and the photo layer 1012 with the hologram stored therein, this attempt will lead to damage of the hologram layer, i.e. the photo layer 1012, so that it cannot be used further. Thus, it is not possible to switch holograms and apply the hologram to another monolithic material body for counterfeiting purposes is not possible.

LIST OF REFERENCE SIGNS

1 Security document body
2 Laminated body
10 Holographic film
11 Backing substrate layer
12 Photo layer
13 Holographic film protective sheet
20 Contact copying station
24 Hologram master
26 Laser
26 Coherent light
27 Spatial light modulator (SLM)
28 Individually modulated coherent light
29 Diffracted (reconstructed) light
30 Fixating station
40 Separating station
50 Protective sheet
51 Backing sheet
52 Covering sheet
60 Coating station
70 Curing/fixating station
110, 120, 130, 140, 150 Additional substrate layers
160, 170, 180, 190, 200 Processing stations (printing, punching/embossing, inserting elements such as chips, etc.)
300, 300 Collating station
310 Substrate layer stack
400 Laminating station
500 Trimming/separating station
600 Post-processing station (e.g. laser marking, electronic marking, etc.)
800 Separating device
900 Curing station
1011 Material layer (corresponding to backing substrate layer 11)
1012 Material layer (corresponding to photo layer 12)
1050 Material layer (corresponding to protective sheet 50)
1110, 1120, 1130, 1140, 1150 Material layer (corresponding to additional substrate layers 110, 120, 130, 140, 150)
1200 Monolithic material body
2001-2007 Transitions

The invention claimed is:

1. A method of integrating a hologram into a security document body that comprises a laminated body, the method comprising:
    providing a holographic film having a backing substrate layer and a photo layer;
    providing additional substrate layers;
    collating the holographic film in a substrate layer stack together with the additional substrate layers;
    combining the holographic film and the additional substrate layers in a lamination process to form the laminated body; and
    laminating a curable protective sheet directly onto the photo layer before the combining step.

2. The method according to claim 1, which comprises exposing the holographic film prior to laminating the curable protective sheet onto the photo layer.

3. The method according to claim 1, which comprises fixing the hologram in the holographic film simultaneously with curing the laminated protective sheet.

4. The method according to claim 1, wherein the backing substrate layer is a plastic layer formed of the same polymer material as at least one of the additional substrate layers adjoining the backing substrate layer.

5. The method according to claim 1, which comprises curing the curable protective sheet by irradiation with electromagnetic radiation.

6. The method according to claim 1, which comprises curing the curable protective sheet on the photo layer before the combining step.

7. The method according to claim 1, wherein the photo layer includes a photopolymer.

8. A security document body having a hologram, the document body comprising:
    a laminated body with a plurality of mutually adjoining material layers being a plurality of surface-adjacent substrate layers and a photo layer in which the hologram is stored; and a curable protective sheet laminated directly onto said photo layer;

said material layer forming said photo layer being bonded on one side to a material layer being a backing substrate layer, which is an outer member of said plurality of mutually adjacent material layers forming said substrate layers;

said plurality of material layers corresponding to said substrate layers including said backing substrate layer, with which said material layer being said photo layer with the hologram is connected, are bonded together by a lamination method to form said laminated body.

9. The security document body according to claim 8, wherein said photo layer includes a photopolymer.

\* \* \* \* \*